(12) United States Patent
Bollinger et al.

(10) Patent No.: US 10,168,348 B2
(45) Date of Patent: Jan. 1, 2019

(54) METHOD FOR DETERMINING AN AVERAGE SEGMENT TIME OF AN ENCODER WHEEL OF AN INTERNAL COMBUSTION ENGINE

(71) Applicant: Robert Bosch GmbH, Stuttgart (DE)

(72) Inventors: Stefan Bollinger, Marbach am Neckar (DE); Joachim Palmer, Korntal-Muenchingen (DE); Bjoern Bischoff, Ludwigsburg (DE); Michael Walter, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 347 days.

(21) Appl. No.: 14/897,132

(22) PCT Filed: May 22, 2014

(86) PCT No.: PCT/EP2014/060518
§ 371 (c)(1),
(2) Date: Dec. 9, 2015

(87) PCT Pub. No.: WO2014/198509
PCT Pub. Date: Dec. 18, 2014

(65) Prior Publication Data
US 2016/0124011 A1    May 5, 2016

(30) Foreign Application Priority Data

Jun. 10, 2013  (DE) ........................ 10 2013 210 741

(51) Int. Cl.
*F02D 41/12*  (2006.01)
*G01P 3/44*  (2006.01)
(Continued)

(52) U.S. Cl.
CPC ............ *G01P 3/44* (2013.01); *F02D 41/0097* (2013.01); *F02D 41/1497* (2013.01);
(Continued)

(58) Field of Classification Search
CPC ................................................ F02D 2200/101
See application file for complete search history.

(56) References Cited

U.S. PATENT DOCUMENTS 4,532,798 A * 8/1985 Kohama ............... G01M 15/08
702/33
6,363,318 B1 * 3/2002 Wang .................. F02D 41/0097
123/352
(Continued)

FOREIGN PATENT DOCUMENTS

CN    102791964 A    11/2012
CN    103097863 A    5/2013
(Continued)

*Primary Examiner* — Mohamed Charioui
(74) *Attorney, Agent, or Firm* — Norton Rose Fulbright US LLP; Gerard Messina

(57) ABSTRACT

A method for determining an average segment time of an encoder wheel of an internal combustion engine, the encoder wheel being connected in rotationally fixed fashion to a crankshaft of the internal combustion engine, markings being situated along the circumference of the encoder wheel, and the crankshaft of the internal combustion engine passing through specified angular ranges during segment times, segment times being acquired, associated rotational speed values being determined from the segment times, a rotational speed curve being determined from the individual determined rotational speed values, a value of the average rotational speed being determined from the rotational speed curve, and an average segment time being determined from the value of the average rotational speed.

12 Claims, 2 Drawing Sheets

(51) Int. Cl.
*F02D 41/24* (2006.01)
*F02D 41/00* (2006.01)
*F02D 41/14* (2006.01)
*F02D 41/26* (2006.01)
*G01P 3/487* (2006.01)

(52) U.S. Cl.
CPC ......... *F02D 41/2429* (2013.01); *F02D 41/26* (2013.01); *G01P 3/487* (2013.01); *F02D 41/12* (2013.01); *F02D 41/123* (2013.01); *F02D 41/1498* (2013.01); *F02D 41/247* (2013.01); *F02D 2200/101* (2013.01)

(56) References Cited

U.S. PATENT DOCUMENTS

2003/0236611 A1* 12/2003 James ................ F02D 41/1497
  701/111

2005/0065707 A1* 3/2005 Kaga ..................... F02D 41/182
  701/103
2013/0125636 A1* 5/2013 Cwik .................. F02N 11/0855
  73/115.05

FOREIGN PATENT DOCUMENTS

| | | |
|---|---|---|
| DE | 3604904 A1 | 8/1987 |
| DE | 43 19 677 | 12/1994 |
| DE | 10 2004 015038 | 10/2005 |
| DE | 102010061084 A1 | 7/2011 |
| DE | 10 2010 009648 | 9/2011 |
| JP | S62173343 A | 7/1987 |
| JP | 2011140938 A | 7/2011 |
| JP | 2011202624 A | 10/2011 |
| JP | 2011 220164 | 11/2011 |
| WO | WO 01/77692 | 10/2001 |

* cited by examiner

METHOD FOR DETERMINING AN AVERAGE SEGMENT TIME OF AN ENCODER WHEEL OF AN INTERNAL COMBUSTION ENGINE

FIELD OF THE INVENTION

The present invention relates to a method for determining an average segment time of an encoder wheel of an internal combustion engine.

BACKGROUND INFORMATION

In internal combustion engines, an encoder wheel can be used to determine the rotational speed of the internal combustion engine. A crankshaft angular range, referred to as a segment, can be assigned to a particular range of the piston movement of each cylinder of the internal combustion engine. These segments can be realized for example by markings on the encoder wheel coupled to the crankshaft.

A segment time in which the crankshaft passes through this angular range is a function of, inter alia, the energy converted in the combustion stroke. Combustion misfires, or other causes of uneven running of the internal combustion engine, are therefore reflected in the segment times. Accordingly, segment times are a measure of the uneven running of an internal combustion engine.

In order to make it possible to determine the uneven running from a segment time signal, the segment time signal must first be processed, and oscillations must be filtered out. For this purpose, an average segment time, or average value of the segment times, can be subtracted from the segment time signal. In DE 36 04 904, for example a floating average value is determined over two and eight segments of an encoder wheel. According to DE 43 19 677 A1, a cylinder-specific segment period duration is determined from the individual segment times using a weighted average value formation.

In this context the problem arises that the average segment time cannot be determined precisely, especially given comparatively large rotational speed gradients. Such large rotational speed gradients occur for example in coasting operation or freely falling operation of the internal combustion engine.

Therefore, it is desirable to provide a possibility for making it possible to determine the average segment time of an encoder wheel of an internal combustion engine in a simple manner.

SUMMARY OF THE INVENTION

According to the present invention, a method is proposed for determining an average segment time of an encoder wheel of an internal combustion engine having the features described herein. Advantageous embodiments are the subject matter of the further descriptions herein of the following description.

The method according to the present invention represents an easily implemented possibility for determining the average segment time of the encoder wheel. Here, already-present components and parts of the internal combustion engine can be used. It is not necessary to carry out rebuilding or modification of the internal combustion engine. The determined average segment time can be used for further functions of the internal combustion engine, such as uneven running regulation.

Here, the encoder wheel is connected in rotationally fixed fashion to a crankshaft of the internal combustion engine. Alternatively, the encoder wheel can also be connected in rotationally fixed fashion to a camshaft of the internal combustion engine. Along the circumference of the encoder wheel, the markings are configured in particular so as to be essentially equidistant.

Segment times are determined as temporal intervals between each two determined markings of the encoder wheel.

The markings of the encoder wheel are scanned for example using a sensor, for example a magnetic sensor, and a measurement signal, for example an electrical voltage signal, is determined. From this measurement signal, the temporal intervals between two markings can be determined as segment times. In this way, a segment time signal is determined as a temporal curve of the segment times associated with the individual pairs of markings.

For the determination according to the present invention of the average segment time, the segment time signal is not evaluated directly. Instead, the average segment time is determined via an evaluation of rotational speed values that are determined from the segment time signal. For this purpose, in each case an associated rotational speed value is determined from the individual segment times, from the rotational speeds an average rotational speed is determined, and from this an average segment time is determined.

Through the individual rotational speed values, plotted over time, for example a best-fit curve is plotted, and in this way a rotational speed curve over time is determined. Using this best-fit curve, a value of the average rotational speed is determined. In particular, a value for the rotational speed is extrapolated. This value of the average rotational speed can in particular be a current value (this segment) or a future value (the next segment) of the average rotational speed. From this extrapolated value of the average rotational speed, in turn a segment time is determined that is determined as average segment time. The average segment time is thus determined using a model for estimating the rotational speed that corresponds, to a very good approximation, to the actual curve of the rotational speed, and has only very small errors.

The rotational speed curve may be determined over time as a best-fit curve, through the individual determined rotational speed values over a working cycle. As duration of a working stroke, for example a period duration can be selected of the lowest frequency of the oscillation that is still to be determined, for example a camshaft frequency or an ignition frequency of the internal combustion engine.

The best-fit curve may be determined using a linear or quadratic regression method. However, the present invention is not intended to be limited to regression methods. For example, the method of least squares can also be used. In a method of least squares, in contrast to a regression method, the (measurement) errors of the individual (measurement) points, that is, the individual rotational speed values, are taken into account.

Advantageously, the internal combustion engine is operated in coasting operation or in a freely falling operation, or with a large rotational speed gradient. Under these operating conditions of the internal combustion engine, the determination according to the present invention of the average segment time from rotational speeds has significant advantages in comparison with a determination of the average segment time directly from the segment times.

This is because under these operating conditions of the internal combustion engine, segment times have a hyperbolic curve, or in general a nonlinear curve. In contrast, the rotational speed advantageously has a linear curve. In this way, from the rotational speed values determined from the segment times a best-fit straight line can easily be plotted as a linear best-fit curve with high precision and low error. The extrapolation of the current and/or future value of the average rotational speed can also be carried out with a low error.

A difference may be determined between a currently acquired segment time and the determined average segment time. In this way, a segment time signal is determined that is correctly filtered from the average segment time. This filtered segment time signal then contains only information concerning uneven running of the internal combustion engine or of the encoder wheel, without disturbance by a rotational speed gradient.

There may take place a calibration of a pre-injection of the internal combustion engine. Because in future drive train configurations, for example of hybrid vehicles, it may be the case that coasting operation is no longer provided, the calibration of the pre-injections can take place in a freely falling operating mode. For this purpose, a determination according to the present invention of the average segment time and of the segment time signal filtered from the average segment time is particularly to be recommended.

A computing unit according to the present invention, e.g. a control device of a motor vehicle, is set up, in particular in terms of programming, to carry out a method according to the present invention.

The implementation of the method in the form of software is also advantageous because this results in particularly low costs, in particular if an executing control device is also used for further tasks and is therefore already present. Suitable data carriers for providing the computer program include in particular diskettes, hard drives, flash memories, EEPROMs, CD-ROMs, DVDs, and others. Downloading a program over computer networks (Internet, intranet, etc.) is also possible.

Further advantages and embodiments of the present invention result from the description and the accompanying drawing.

Of course, the features named above and explained below may be used not only in the respectively indicated combination, but also in other combinations, or by themselves, without departing from the scope of the present invention.

The present invention is shown schematically in the drawing on the basis of exemplary embodiments, and is described below in detail with reference to the drawings.

DETAILED DESCRIPTION

Figure 1:
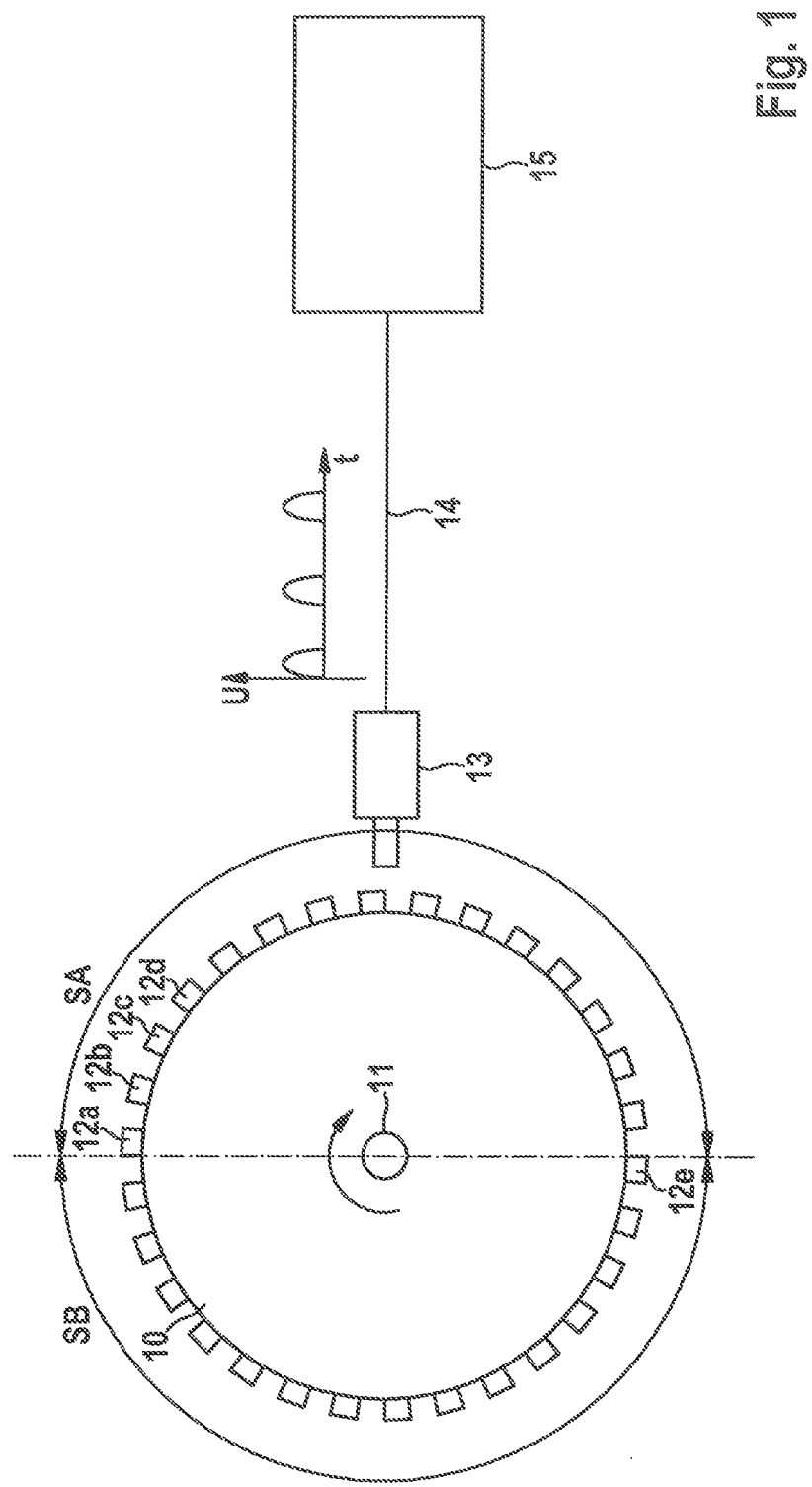
FIG. 1 schematically shows a configuration fashioned in order to execute a specific embodiment of a method according to the present invention.

In FIG. 1, a system fashioned to execute a specific embodiment of a method according to the present invention is shown schematically.

An encoder wheel 10 is connected to a crankshaft 11 of an internal combustion engine (not shown in FIG. 1) of a motor vehicle. The circumference or edge of encoder wheel 10 has markings ("teeth") symbolically designated by the four reference characters 12a, 12b, 12c, and 12d. The markings can be configured, for example for 60 or 60-2 teeth, with a respective spacing of 6°.

Encoder wheel 10 can be divided into a plurality of segments, in particular essentially equidistant from one another. In the specific example of FIG. 1, encoder wheel 10 is divided into two segments SA and SB, each 180°, between marking 12a and marking 12e.

For example, in an internal combustion engine having four cylinders, a segment SA or SB corresponds to a crankshaft movement of 180° and a piston stroke of a piston of the internal combustion engine. Here, a piston stroke is to be understood as the movement of the piston between top dead center OT and lower dead center UT.

A sensor is fashioned as a Hall sensor 13. Hall sensor 13 is situated close to the edge of encoder wheel 10, and is connected with a line 14 to a control device 15 of the internal combustion engine. Control device 15 is set up to carry out a specific embodiment of a method according to the present invention.

During operation of the internal combustion engine, crankshaft 11 rotates, and encoder wheel 10 also rotates therewith. The beginning of each marking produces a voltage pulse in sensor 13. An associated voltage signal is shown schematically in FIG. 1 as diagram U(t).

Figure 2:
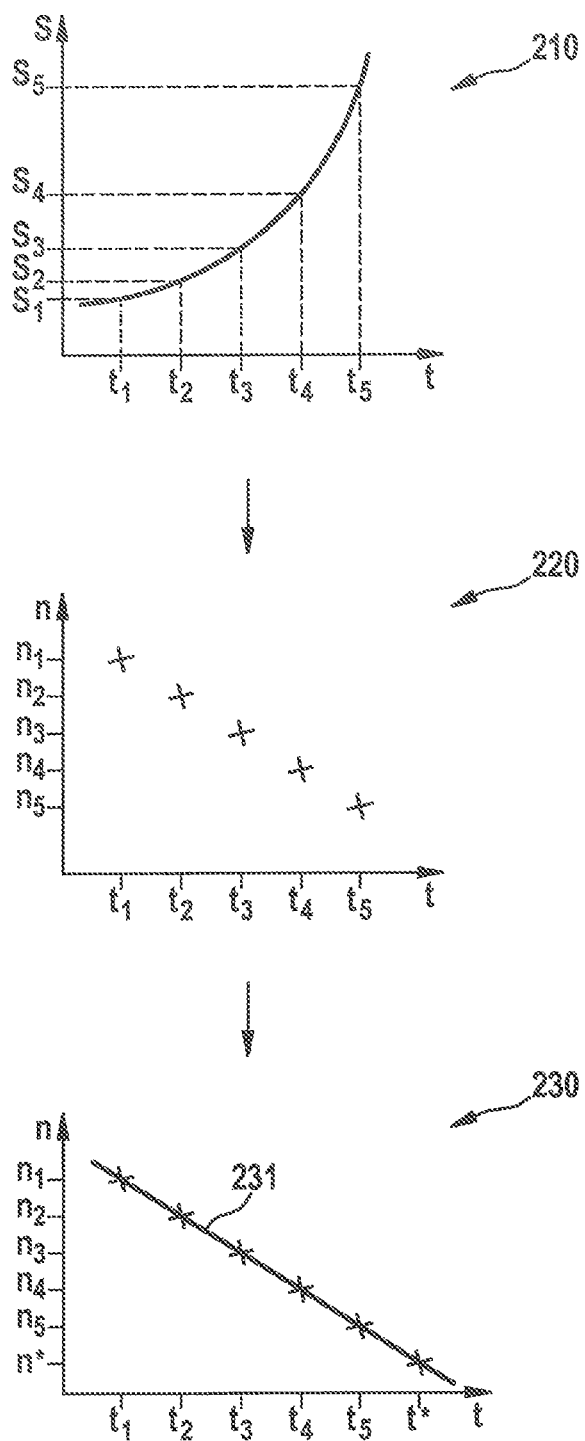
FIG. 2 shows schematic diagrams that can be determined in the course of a specific embodiment of a method according to the present invention.

Control device 15 evaluates voltage signal U(t) and determines therefrom the segment times as differences in the times at which the voltage pulses of the corresponding markings of the encoder wheel, in this example markings 12a and 12e, were acquired. In addition, control device 15 executes a specific embodiment of a method according to the present invention explained on the basis of FIG. 2. In FIG. 2, diagrams are shown schematically that can be determined in the course of a specific embodiment of a method according to the present invention.

Diagram 210 describes the first method step of the method according to the present invention, and shows a diagram of segment times s plotted over time t. Diagram 210 thus shows a temporal curve of the acquired segment times. Here, the internal combustion engine is in coasting operation, in which, when the frictional power connection is not separated, the internal combustion engine is kept in rotational motion. The rotational speed decreases rapidly and a comparatively large rotational speed gradient $\Delta n$ occurs. For example, in the following example a rotational speed gradient of $\Delta n=1500$ RPM/s is assumed. The value of successive segment times increases accordingly. As is shown in diagram 210, the values of segment times $s_1$ to $s_5$, acquired at times $t_1$ to $t_5$, increase. The segment times however do not increase in linear fashion, but rather in approximately hyperbolic fashion.

According to the present invention, the segment times are therefore converted into rotational speed values n. This can take place for example using the designation n=N/s, where N is the standard number of markings of the encoder wheel.

The rotational speed values $n_1$ to $n_5$ associated with times $t_1$ to $t_5$, determined from segment times $s_1$ to $s_5$, are shown in diagram 220 in a rotational speed-time diagram. In the next method step, a best-fit curve is then plotted via rotational speed values $n_1$ to $n_5$. In this specific example, this takes place using a linear regression method.

In diagram 230, which shows a rotational speed-time diagram analogous to diagram 220, the best-fit curve is shown as best-fit straight line 231. Because the rotational speed gradient runs in linear fashion, best-fit straight line 231 can be plotted through the rotational speed values with a high degree of precision and low error. In addition, an average value of the rotational speed can be extrapolated with a high degree of precision. In the diagram, such an extrapolated value is shown for average rotational speed n* at a time t*. Time t* can be a current time for which the current value of average rotational speed n* is determined. Time t* can also be a future time for which a future value of average rotational speed n* is estimated. The value of rotational speed n* is finally converted again into a segment time, and is determined as average segment time s*=N/n*.

What is claimed is:

1. A method for determining an average segment time of an encoder wheel of an internal combustion engine, the method comprising:
    operating the internal combustion engine in a coasting operation or in a freely falling operation or with a large rotational speed gradient;
    while the internal combustion engine is operating in the coasting operation or in the freely falling operation or with the large rotational speed gradient, acquiring segment times using a sensor, via a control device, wherein the encoder wheel is connected in a rotationally fixed manner to a crankshaft of the internal combustion engine, markings being situated along a circumference of the encoder wheel, and the crankshaft of the internal combustion engine passing through specified angular ranges during segment times;
    determining, via the control device, associated rotational speed values from the segment times;
    determining, via the control device, a rotational speed curve over time from the individual ones of the determined rotational speed values;
    determining, via the control device, a value of an average rotational speed from the rotational speed curve;
    determining, via the control device, an average segment time from the value of the average rotational speed; and
    controlling the internal combustion engine using the determined average segment time, the controlling including regulating uneven running of the internal combustion engine based on the determined average segment time.

2. The method of claim 1, wherein the rotational speed curve over time is determined as a best-fit curve through the individual determined rotational speed values over a working cycle of the internal combustion engine.

3. The method of claim 2, wherein the average rotational speed is determined from the rotational speed curve using a linear or quadratic regression method, or using a method of least squares.

4. The method of claim 1, wherein a difference is determined of a currently acquired segment time and the determined average segment time.

5. The method of claim 1, wherein there is a calibration of a pre-injection of the internal combustion engine.

6. A computing unit for determining an average segment time of an encoder wheel of an internal combustion engine, comprising:
    a computing arrangement configured to perform the following:
        operating the internal combustion engine in a coasting operation or in a freely falling operation or with a large rotational speed gradient;
        while the internal combustion engine is operating in the coasting operation or in the freely falling operation or with the large rotational speed gradient, acquiring segment times using a sensor, wherein the encoder wheel is connected in a rotationally fixed manner to a crankshaft of the internal combustion engine, markings being situated along a circumference of the encoder wheel, and the crankshaft of the internal combustion engine passing through specified angular ranges during segment times;
        determining associated rotational speed values from the segment times;
        determining a rotational speed curve over time from the individual ones of the determined rotational speed values;
        determining a value of an average rotational speed from the rotational speed curve; and
        determining an average segment time from the value of the average rotational speed; and
        controlling the internal combustion engine using the determined average segment time, the controlling including regulating uneven running of the internal combustion engine based on the determined average segment time.

7. The method of claim 1, wherein the rotational speed curve over time is determined as a best-fit curve through the individual determined rotational speed values over a working cycle of the internal combustion engine, wherein a difference is determined of a currently acquired segment time and the determined average segment time, and wherein there is a calibration of a pre-injection of the internal combustion engine.

8. The method of claim 7, wherein the average rotational speed is determined from the rotational speed curve using a linear or quadratic regression method, or using a method of least squares.

9. A non-transitory computer readable medium having a computer program, which is executable by a processor, comprising:
    a program code arrangement having program code for determining an average segment time of an encoder wheel of an internal combustion engine, by performing the following:
        operating the internal combustion engine in a coasting operation or in a freely falling operation or with a large rotational speed gradient;
        while the internal combustion engine is operating in the coasting operation or in the freely falling operation or with the large rotational speed gradient, acquiring segment times using a sensor, via the processor, wherein the encoder wheel is connected in a rotationally fixed manner to a crankshaft of the internal combustion engine, markings being situated along a circumference of the encoder wheel, and the crankshaft of the internal combustion engine passing through specified angular ranges during segment times;
        determining, via the processor, associated rotational speed values from the segment times;
        determining, via the processor, a rotational speed curve over time from the individual ones of the determined rotational speed values;
        determining, via the processor, a value of an average rotational speed from the rotational speed curve; and
        determining, via the processor, an average segment time from the value of the average rotational speed;
        controlling the internal combustion engine using the determined average segment time, the controlling including regulating uneven running of the internal combustion engine based on the determined average segment time.

10. The computer readable medium of claim 9, wherein the rotational speed curve over time is determined as a best-fit curve through the individual determined rotational speed values over a working cycle of the internal combustion engine.

11. The computer readable medium of claim 10, wherein the average rotational speed is determined from the rotational speed curve using a linear or quadratic regression method, or using a method of least squares.

12. The computing unit of claim 6, wherein the rotational speed curve over time is determined as a best-fit curve through the individual determined rotational speed values over a working cycle of the internal combustion engine.

* * * * *